Figure 1:
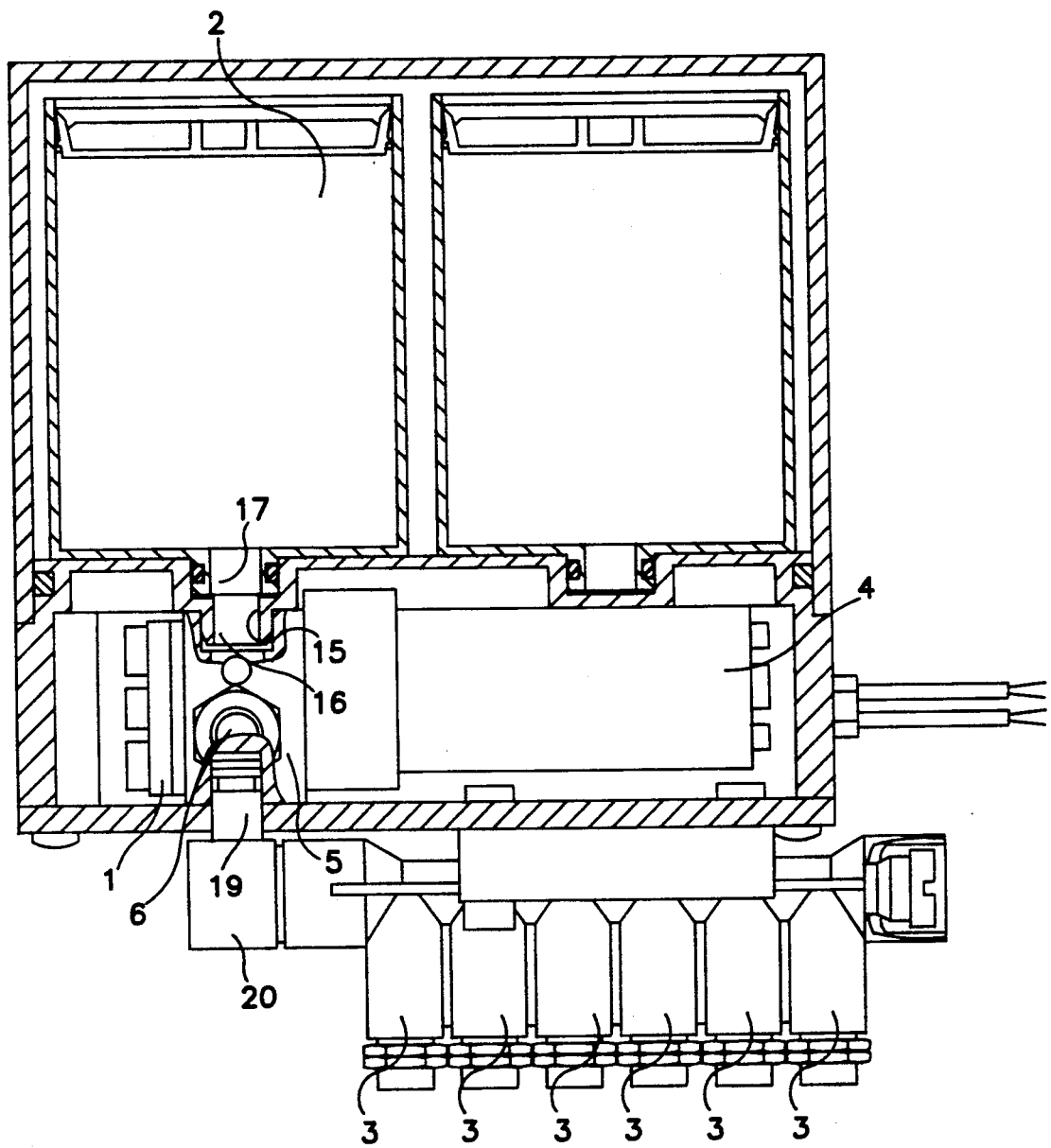

United States Patent [19]

Meuer et al.

[11] Patent Number: 5,188,197
[45] Date of Patent: Feb. 23, 1993

[54] CENTRAL-LUBRICATION ASSEMBLY

[75] Inventors: Johannes Meuer; Dieter Todtenhaupt; Dieter Schönherr, all of Berlin, Fed. Rep. of Germany

[73] Assignee: Willy Vogel AG, Berlin, Fed. Rep. of Germany

[21] Appl. No.: 819,337

[22] Filed: Jan. 9, 1992

[30] Foreign Application Priority Data

Jan. 10, 1991 [DE] Fed. Rep. of Germany ....... 4100723

[51] Int. Cl.$^5$ .............................................. F16N 27/00
[52] U.S. Cl. ..................................... 184/7.4; 184/7.2; 137/102; 137/116.3
[58] Field of Search ...................... 137/102, 115, 116.3; 184/7.2, 7.3, 7.4, 42, 39.1

[56] References Cited

U.S. PATENT DOCUMENTS

| 2,109,832 | 3/1938 | Tear | 137/102 |
| 2,141,022 | 12/1938 | Rotter | 184/7.4 |
| 2,855,069 | 10/1958 | Graves | 184/7.4 |
| 4,635,671 | 1/1987 | Viegas | 137/102 |

FOREIGN PATENT DOCUMENTS 0211890 4/1956 Australia .............................. 184/7.4

Primary Examiner—James C. Yeung
Assistant Examiner—Alan B. Cariaso
Attorney, Agent, or Firm—Mark P. Stone

[57] ABSTRACT

In a central-lubrication assembly for vehicles, with a lubricant reservoir, with a lubricant pump connected on the inlet side to the lubricant reservoir and on the outlet side to at least one lubricant distributor, there is used for the pressure relief of the lubricant distributor and for limiting the pressure built up by the lubricant pump a combined pressure-relief and pressure-limiting valve (6) which is equipped with a piston (9) displaceable counter to the effect of a return spring (8) in a bore (7) of a housing (5). The piston (9) can assume three different working positions, in a first position the pressure relief being obtained, and in a third position pressure limitation in the system being ensured.

2 Claims, 2 Drawing Sheets

CENTRAL-LUBRICATION ASSEMBLY

BACKGROUND OF THE INVENTION

The invention relates to a central-lubrication assembly for vehicles, with a lubricant reservoir, with a lubricant pump connected on the inlet side to the lubricant reservoir and on the outlet side to at least one lubricant distributor, and with means for the pressure relief of the lubricant distributor and for limiting the pressure built up by the lubricant pump.

German Auslegesschrift 1,184,659 makes known a central-lubrication assembly of the abovementioned type, in which the means for the pressure relief of the lubricant distributors designed as piston distributors and for limiting the maximum value of the pressure built up by the lubricant pump are formed by two valves independent of one another. The use of two valves involves a high outlay.

SUMMARY OF THE INVENTION

The object on which the invention is based is to provide a central-lubrication assembly of the relevant generic type, in which the two functions of the pressure relief of lubricant distributors designed as piston distributors and of pressure limitation in the supply system for the lubricant distributors are performed by a single valve. This object is achieved, according to the invention, in that the pressure-relief means consist of a valve which also serves for pressure limitation and which has a piston which is displaceable counter to the effect of a return spring in a bore of a housing and which, in a first position, connects a first channel leading to the lubricant reservoir to a second channel leading to the lubricant distributor, in a second position connects a third channel leading to the pump outlet to the second channel leading to the lubricant distributor, at the same time closing the first channel leading to the lubricant reservoir, and in a third position connects all three abovementioned channels to one another.

The use of a combined pressure-relief and pressure-limiting valve makes it possible to reduce the costs and space requirement of the central-lubrication assembly.

DESCRIPTION OF THE BEST MODE FOR CARRYING OUT THE INVENTION

Figure 2:
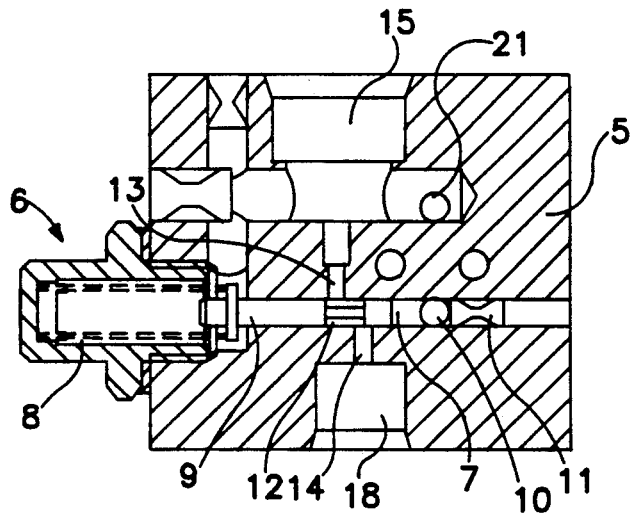
Figure 3:
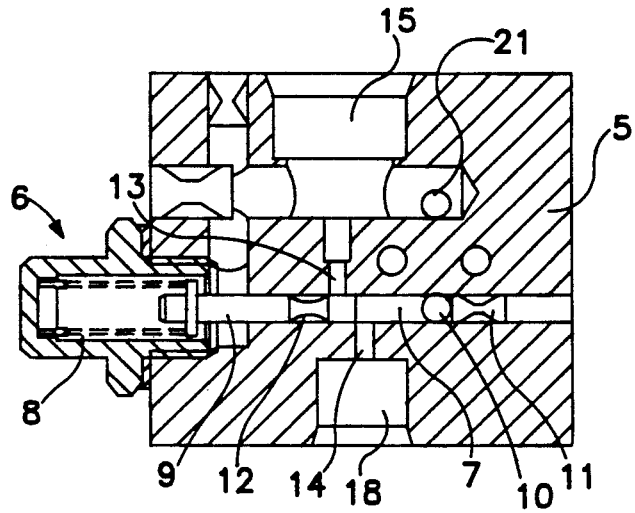
Figure 4:
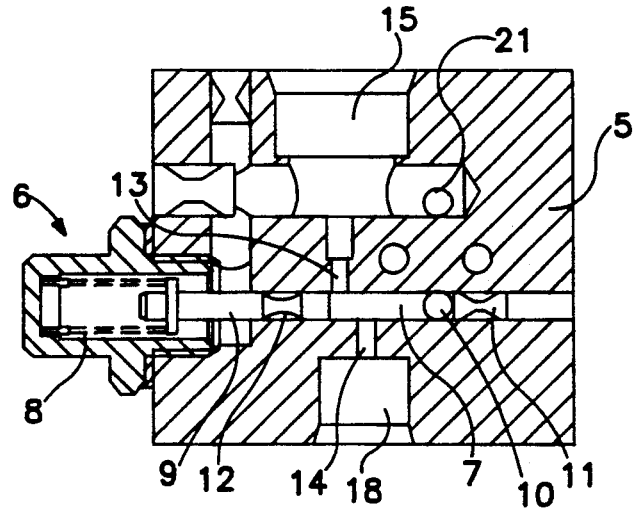

Further features and details of the invention emerge from the subclaims and from the following description of an exemplary embodiment illustrated in the accompanying drawing. In this:

FIG. 1 shows, partially in section, the side view of a central-lubrication assembly, FIG. 2 shows a section through the combined relief and pressure-limiting valve of the assembly according to FIG. 1, arranged in a valve block, in a first position, FIG. 3 shows a section corresponding to the section according to FIG. 1, in a second position of the valve, and FIG. 4 shows a section corresponding to the section according to FIG. 1, in a third position of the valve.

FIG. 1 shows a central-lubrication assembly of highly compact overall design, with a lubricant pump 1 designed as a gear pump and conveying the lubricant out of a lubricant reservoir 2, in the form of a lubricant cartridge filled with lubricant, to six lubricant distributors 3. The lubricant distributors 3 are designed in a known way as piston distributors, that is to say they are supplied with lubricant by the lubricant pump and, after pressure relief, convey under the effect of spring force an exactly metered quantity of lubricant corresponding to their setting to the respective lubricating points. For driving the lubricant pump 1 there is an electric motor 4, between which and the lubricant pump 1 is arranged a so-called valve block forming a housing 5 for a combined pressure-relief and pressure-limiting valve 6, the design and mode of operation of which are explained in more detail by means of FIGS. 2 to 4.

The combined pressure-relief and pressure-limiting valve 6 has a piston 9 which is displaceable to and fro in a bore 7 counter to the effect of a return spring 8 and which is subjected via a channel 10 by the lubricant pump 1 to fluid grease as soon as the latter is put into operation. This takes place at intervals dependent on the operating conditions of the vehicle to be lubricated. The bore 7 is closed at its end located opposite the piston 9 by means of a plug 11. When the lubricant pump 1 is not working, the valve 6 assumes the position shown in FIG. 2, in which channels 13, 14 are connected to one another via an annular groove 12 of the piston 9, of these channels the channel 13 opening into a receptacle 15 for a mouthpiece 16 which is connected to the lubricant reservoir 2 and which is so designed that it as it were extends the actual mouthpiece 17 of the lubricant cartridge. In contrast, the channel 14 is connected to a receptacle 18, into which projects the mouthpiece 19 of a connection piece 20 connecting the valve block 5 to a line leading to the lubricant distributors 3.

When the lubricant pump 1 starts up, it sucks fluid grease out of the lubricant reservoir 2 via a channel 21 and forces it into the bore 7. The piston 9 is thereby moved into the position shown in FIG. 3, in which it shuts off the channel 13. It remains in this position until all the lubricant distributors 3 have been supplied with fluid grease. When this is so, that is to say when the metering chambers of the lubricant distributors can no longer receive any further fluid grease and the lubricant pump 1 continues to run, a pressure rise in the bore 7 and a further displacement of the piston 9 into the position according to FIG. 4 take place. In the last-mentioned position, the piston 9 has reopened the channel 13, and therefore the lubricant pump 1 can convey fluid grease back into the lubricant reservoir 2, until it is cut off. After the cut-off of the pump, the pressure in the bore 7 decreases within a very short time and the piston 9 returns to the position shown in FIG. 2. After the pressure relief, in a known way the lubricant distributors 3 can, in the supply line, convey the metered quantity of lubricant previously stored in them to the respective lubricating points assigned to them.

We claim:

1. A single-line central-lubrication assembly for vehicles, with a lubricant reservoir, with a lubricant pump, an inlet side of said lubricant pump being connected to said lubricant reservoir and an outlet side of said lubricant pump being connected to at least one lubricant distributor, and with a valve for the pressure relief of the lubricant distributor and for limiting the pressure built up by the lubricant pump, said valve having a piston which is displaceable counter to the effect of a return spring in a bore of a housing, wherein the bore (7) is connected via a first channel (10) to the lubricant pump (1) between the piston (9) and a closed end located opposite to said piston (9), the piston being provided with a single annular groove (12) which, in a first position of the piston, directly connects the lubricant reservoir (2) via a second channel (13) and a third channel (14) with the lubricant distributor (3) when the lubricant pump (1) is not working, and wherein in a second position of the piston (9) due to the pressure of the lubricant pumped by the pump (1) the direct connection between the lubricant reservoir (2) and the distributor (3) is cut off while at the same time the lubricant reservoir (2) is connected to the distributor (3) via the pump (1) and said first and third channels (10, 14), and wherein in a third position of the piston (9) due to an enlarged pressure of the lubricant pump by the pump (1) said first, second and third channels (10, 13, 14) are connected to the bore (7) between its closed end and the piston (9).

2. The central-lubrication assembly as claimed in claim 1, wherein the housing (5) for the relief and pressure-limiting valve (6) formed by a valve block is equipped with a receptacle (15) for a mouthpiece (16) connected to the lubricant reservoir (2) and with a receptacle (18) for the mouthpiece (19) of a connection piece (20) for a line to the lubricant distributor (3).

* * * * *